US010491936B2

(12) United States Patent
Aghdasi et al.

(10) Patent No.: US 10,491,936 B2
(45) Date of Patent: Nov. 26, 2019

(54) SHARING VIDEO IN A CLOUD VIDEO SERVICE

(71) Applicant: Pelco, Inc., Clovis, CA (US)

(72) Inventors: Farzin Aghdasi, Clovis, CA (US); Kirsten A. Medhurst, Fairfax, VA (US); Greg M. Millar, Coarsegold, CA (US); Stephen J. Mitchell, Reedley, CA (US)

(73) Assignee: PELCO, INC., Clovis, CA (US)

( * ) Notice: Subject to any disclaimer, the term of this patent is extended or adjusted under 35 U.S.C. 154(b) by 159 days.

(21) Appl. No.: 15/105,469

(22) PCT Filed: Dec. 18, 2013

(86) PCT No.: PCT/US2013/076194
§ 371 (c)(1),
(2) Date: Jun. 16, 2016

(87) PCT Pub. No.: WO2015/094237
PCT Pub. Date: Jun. 25, 2015

(65) Prior Publication Data
US 2017/0006327 A1 Jan. 5, 2017

(51) Int. Cl.
*H04N 21/2743* (2011.01)
*H04N 21/222* (2011.01)
(Continued)

(52) U.S. Cl.
CPC ......... *H04N 21/2743* (2013.01); *H04N 7/181* (2013.01); *H04N 21/2223* (2013.01);
(Continued)

(58) Field of Classification Search
CPC ........ G06F 17/30017; G06F 17/30575; H04N 21/2223; H04N 21/64707; H04N 21/2743;
(Continued)

(56) References Cited

U.S. PATENT DOCUMENTS

2005/0271250 A1 12/2005 Vallone et al.
2008/0208698 A1* 8/2008 Olson ................ G06Q 20/20
705/21
(Continued)

OTHER PUBLICATIONS

Extended European Search Report for Int'l Application No. PCT/US2013/076194, "Sharing Video In A Cloud Video Service," dated Jul. 14, 2017.

(Continued)

*Primary Examiner* — Chris Parry
*Assistant Examiner* — Weiwei Y Stiltner
(74) *Attorney, Agent, or Firm* — Tutunjian & Bitetto, P.C.

(57) ABSTRACT

A security system images a large amount of data through routine use which is difficult to transfer or share. In one embodiment, through the use of a cloud-based video service and an application program interface, the methods and systems disclosed herein comprise accepting a communication that identifies parameters associated with a video on a video server accessible via a network. The methods and systems further cause the video server to transfer the video via the network to a cloud-based video service location in response to the communication, and transmit a notification to a receiving party (or cause the cloud-based video service location to transmit the notification) in concert with the transfer of the video, which provides availability information of the video at the cloud-based service location. The methods and systems facilitate video sharing amongst parties.

18 Claims, 10 Drawing Sheets

(51) Int. Cl.
*H04N 21/647* (2011.01)
*H04N 21/488* (2011.01)
*H04N 7/18* (2006.01)
*H04N 21/61* (2011.01)

(52) U.S. Cl.
CPC ..... *H04N 21/4882* (2013.01); *H04N 21/6125* (2013.01); *H04N 21/6175* (2013.01); *H04N 21/64707* (2013.01)

(58) Field of Classification Search
CPC ........... H04N 21/4882; H04N 21/6125; H04N 21/6175; H04N 7/181
USPC .................................. 709/217–219; 348/143
See application file for complete search history.

(56) References Cited

U.S. PATENT DOCUMENTS

| | | | |
|---|---|---|---|
| 2008/0218591 A1* | 9/2008 | Heier ..................... | G06Q 20/20 348/150 |
| 2009/0134968 A1* | 5/2009 | Girgensohn ..... | G08B 13/19613 340/3.1 |
| 2009/0219411 A1 | 9/2009 | Marman et al. | |
| 2010/0083303 A1 | 4/2010 | Redei et al. | |
| 2012/0105632 A1* | 5/2012 | Renkis ............. | G08B 13/19619 348/143 |
| 2013/0080916 A1 | 3/2013 | Lopez et al. | |
| 2013/0166711 A1 | 6/2013 | Wang et al. | |
| 2013/0198788 A1 | 8/2013 | Barger et al. | |
| 2014/0071290 A1* | 3/2014 | Collen ..................... | H04N 9/79 348/159 |
| 2015/0062287 A1* | 3/2015 | Reinhardt ........ | H04N 21/23418 348/36 |
| 2015/0077250 A1* | 3/2015 | Lee ......................... | H04L 67/26 340/541 |

OTHER PUBLICATIONS

Notification Concerning Transmittal of International Preliminary Report on Patentability dated Jun. 30, 2016 from International Application No. PCT/US2013/076194, "Sharing Video In A Cloud Video Service," filed Dec. 18, 2013.
Notification of Transmittal of The International Search Report and Written Opinion of the International Searching Authority dated May 23, 2014 from International Application No. PCT/US2013/076194, "Sharing Video In A Cloud Video Service," filed Dec. 18, 2013.

* cited by examiner

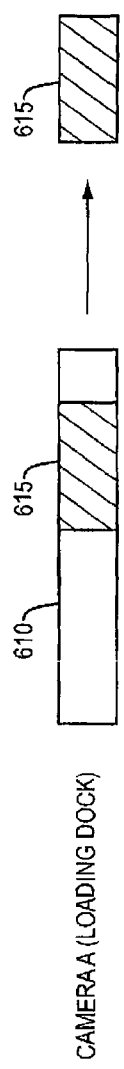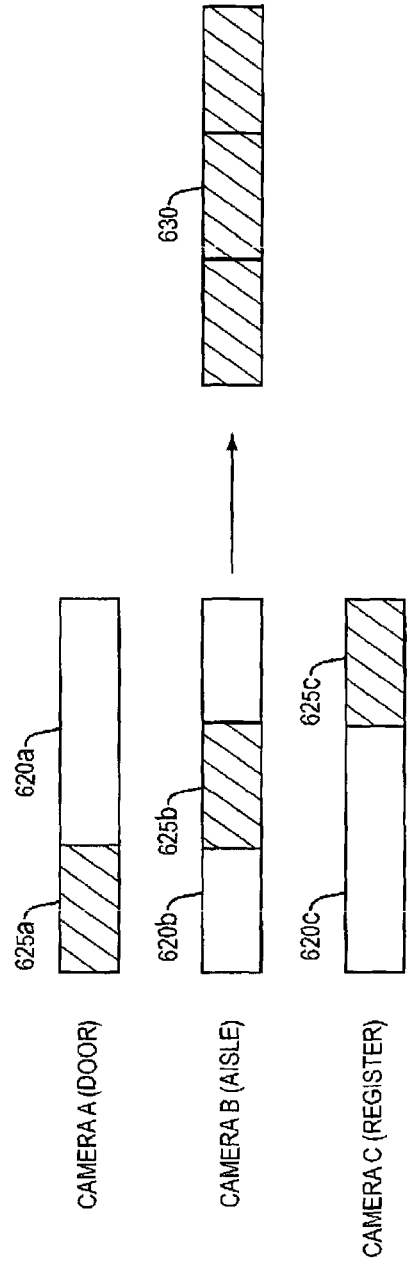

SHARING VIDEO IN A CLOUD VIDEO SERVICE

This application is the U.S. National Stage of International Application No. PCT/US2013/076194, filed Dec. 18, 2013, which designates the U.S., published in English. The entire teachings of the above application are incorporated herein by reference.

BACKGROUND OF THE INVENTION

Security cameras are commonly used to monitor indoor and outdoor locations. Networks of security cameras may be used to monitor a given area. For example, security cameras may be placed throughout a retail store to monitor customers and employees. A user may manually analyze and process the video feeds within the network to track and locate objects within the monitored area. Typical security camera networks operate as a closed system, in which networked security cameras provide video feeds for a single geographic area, and a user observes the video feeds and operates the network from a fixed-location user terminal located at the same geographic area.

SUMMARY OF THE INVENTION

In an example embodiment, a present method relates to sharing video using a cloud-based video service. The method comprises accepting a communication that identifies parameters associated with a video on a video server accessible via a network, the communication being submitted by a source party. The communication causes the video server to transfer the video via the network to a cloud-based video service location responsive to the communication and parameters identified therein. The method further comprises transmitting a notification to a receiving party, or causing the cloud-based video service location to transmit the notification, in concert with the transfer of the video. The notification provides availability information of the video at the cloud-based service location. In another example embodiment, accepting the communication, causing the video server to transfer the video, and transmitting the notification (or causing the notification to be transmitted to the receiving party) occurs at a node executing an application program interface in operative communication with the video server.

In another embodiment, accepting the communication includes accepting an indicator that identifies the receiving party who is to receive the notification of availability of the video.

In another embodiment, causing the video server to transfer the video includes causing the video server to transfer a plurality of time-synchronized videos. In another embodiment, causing the video server to transfer a plurality of time-synchronized videos further comprises selecting the plurality of time-synchronized videos from video segments recorded in parallel between a common start time and a common stop time. In another embodiment, causing the video server to transfer a plurality of time-synchronized videos further comprises selecting the plurality of time-synchronized videos from video segments recorded between a series of non-overlapping start times and stop times.

In another embodiment, causing the video server to transfer the video includes causing the video server to transfer a plurality of content-synchronized videos. In one embodiment, the content synchronized videos are video segments recorded in series or parallel by multiple video collectors that contain a common object. In another embodiment, the common object is a person. In yet another embodiment, the content-synchronized videos are video segments recorded in series or parallel by multiple video collectors that contain a common activity. In another embodiment, the common activity is motion. In yet another embodiment, the common activity is a point of sale transaction.

In another embodiment, the content-synchronized videos are video segments recorded in series or parallel by multiple video collectors that contain at least one common tag. In yet another embodiment, the tag is selected from a group consisting of: a preconfigured tag, automatically generated tag, user generated tag, or signal tag produced as a function of a signal provided by a device under video surveillance. In another embodiment, the signal tag represents an event outside an expected range of activities, and the tag is generated by a point of sale terminal.

In one embodiment, the video server is a plurality of video servers, and the example method further comprises causing the plurality of video servers to transfer a plurality of logically-related videos. In another embodiment, the plurality of logically-related videos are related based on a common location type. In another embodiment, the plurality of logically-related videos are related based on a common content type. In another embodiment, the plurality of logically-related videos are related based on a common tag type.

In another embodiment, a present apparatus relates to sharing video in a cloud-based video service. The apparatus comprises at least one processor and at least one memory with computer code instructions stored thereon, the at least one processor and the at least one memory with computer code instructions being configured to cause the apparatus to: accept a communication that identifies parameters associated with a video on a video server accessible via a network, the communication being submitted by a source party; cause the video server to transfer the video via the network to a cloud-based service location responsive to the communication and parameters identified therein; and transmit a notification to a receiving party, or cause the cloud-based video service location to transmit the notification, in concert with the transfer of the video, the notification providing availability information to the video at the cloud-based service location.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 6A through 6E are illustrations of different methods of processing video timelines and selecting video segments of interest.

DETAILED DESCRIPTION OF THE INVENTION

A description of example embodiments of the invention follows.

Figure 1:
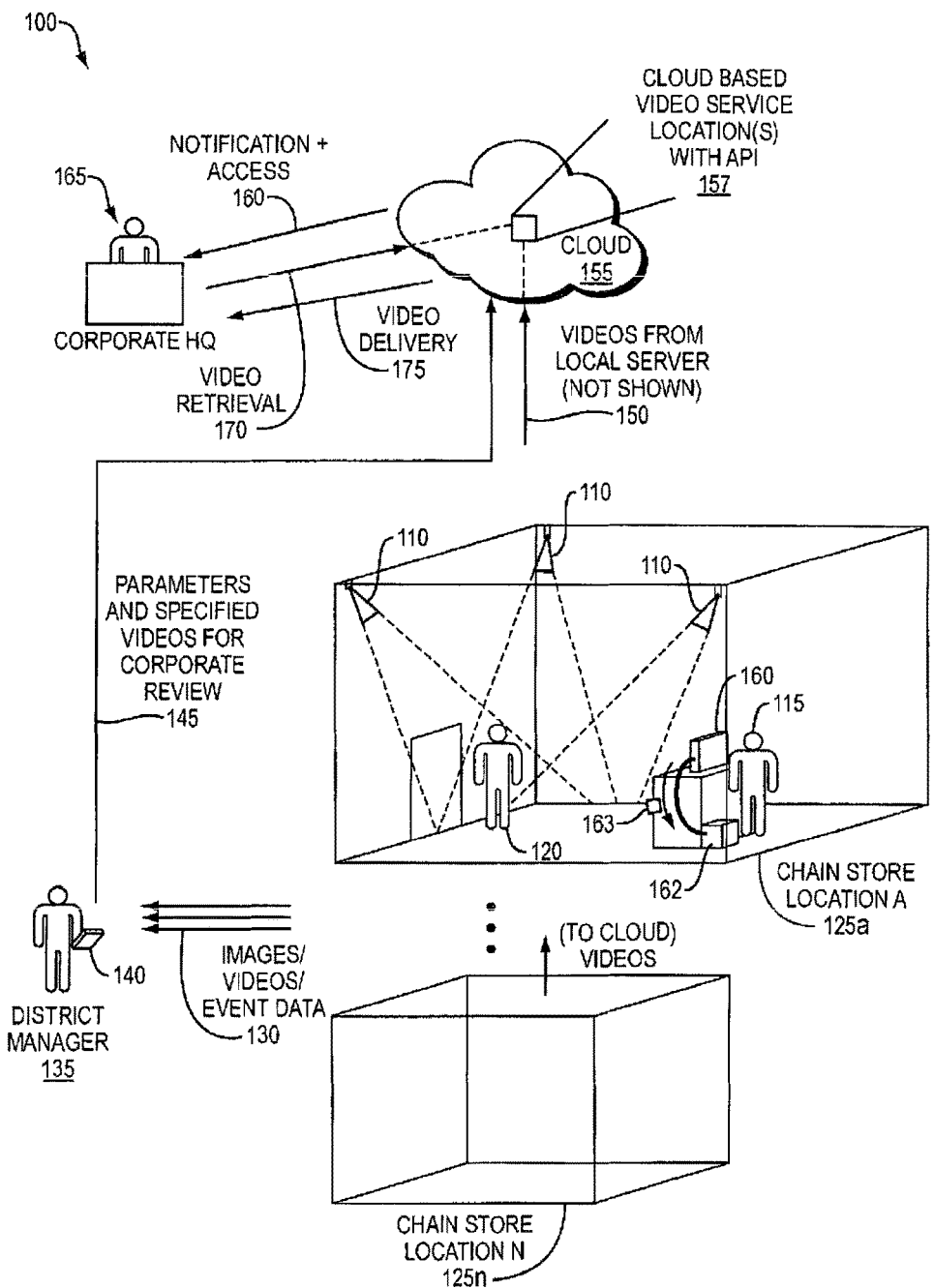
FIG. 1 is an illustration of a retail scene in which example embodiments of the present methods and systems may be implemented.

FIG. 1 is an illustration of a retail scene 100 in which an example embodiment of the present methods and systems may be implemented. Within a retail store 125a, among a chain of retail stores 125a-n, several security cameras 110 may be installed. The cameras 110 may be positioned to image a customer 120 as the customer walks into the store, positioned to image an employee 115, or positioned to image a cash register or point of sale terminal 160. The cameras 110 may be linked through a local area network (not shown) to an in-store video server 162, which is where the videos recorded by the security cameras 110 may be stored. Similar systems can be installed in any number of retail stores 125a-n. The video servers in the retail stores 125a-n may be connected to each other or to a network cloud 155 via the Internet which may be considered as part of the cloud 155 or a communications network between the retails stores 125a-n and the cloud 155. A user connected to either the local area network or the internet may view the video surveillance recorded, including any images, video, and event data 130, if the user has access.

In FIG. 1, for example, the user is the District Manager 135 of the chain store locations A through N 125a-n. The District Manager 135 may view the images, videos, and event data 130 on any suitable viewing device 140, such as a laptop computer, tablet or smart mobile telephone.

The District Manager 135, as the source party, may see videos he or she wishes to share with a receiving party. In the present example, the receiving party is Corporate Headquarters 165. The District Manager 135, however, may not want to, or have the ability to, send the entire video, especially if Corporate Headquarters 165 is located outside of the local area network and transferring an entire video would require significant bandwidth use. The District Manager 135 may, instead, identify a part of a video, or parts of multiple videos, that are of interest to the receiving party by selecting parameters that identify the video segments of interest.

For example, if the District Manager 135 wishes to send video occurring between 1:00 PM and 2:00 PM on Thursday, December 5$^{th}$, at Chain Store Location A 125a-n the District Manager 135 may identify those parameters when searching for video content. Videos that fall within the selected parameters become video segments of interest. Similarly, if the District Manager 135 wishes to send all videos occurring between 1:00 PM and 2:00 PM on Thursday, December 5$^{th}$, at Chain Store Locations A through N 125a-n, the District Manager 135 may identify those parameters, and select all relevant videos by simply selecting the desired times and requesting videos from all available video servers. These videos are known as "logically-related videos," and are described in further detail in reference to FIG. 5. Additionally, the District Manager 135 may arrange the selected video segments in any manner desired. Identification and use of parameters in selecting video and video segments is discussed in detail below in reference to FIGS. 6A through 6E.

After the District Manager 135 identifies parameters and specified videos, collectively referred to as information 145, the District Manager 135 may send a signal specifying the information 145 to a cloud-based service location with an application program interface (API) 157, which is in operative communication with the video server 162 via the Internet. The cloud-based service location may then upload the specified video segments 150 from the local video servers (not shown) of Chain Store Locations A through N 125a-n via the Internet. Concurrently, either with the signal by the District Manager 135, or after the video segments are stored in the cloud 155, the cloud-based service location with an API 157 may send a notification 160 informing Corporate Headquarters 165 that the videos are available. Corporate Headquarters 165 may then access the videos 170 from the cloud and the cloud will deliver the videos 175.

Parameters, as used herein, refer to content, time, tags, or various other metadata that may be used to describe information about a video segment of interest. Content parameters refer to video segments that identify specific content in a video. Content can refer to any information captured by a video, such as an object or a location. For example, a user may only wish to see content that features a specific person. In another example, a user may wish to only see content that features a specific activity, such as motion, or a sale transaction at a point of sale terminal. In yet another example, a user may wish to only see content that occurred at a specific location, such as a loading dock. Video segments that are "content-synchronized" share common content, i.e., all videos view a particular person of interest.

Time parameters refer to video segments captured within a specified time frame. A user may wish, for example, to isolate video that occurred between a specific start time and a specific stop time. Further, the user may wish to select video segments that are time-synchronized. Video segments that are "time-synchronized" may be multiple video segments that are recorded in parallel between a common start time and a common stop time. Alternatively, video segments that are time-synchronized may be video segments that occurred in sequence, i.e., they are a series of videos with non-overlapping start times and stop times. For example, if a number of cameras line a hallway, and a person walks down the hallway, the user may wish to follow that person by choosing videos that take place at progressively later times. When the video segments are later processed together, the resulting single (or multiple) video(s) provide a sequence of images that display the person walking down the hallway.

Tags refer to information inserted into a video by an outside source, the video camera, server at the location, or server at the cloud, that the user may later identify. For example, a tag may be created when video cameras begin imaging after an event triggers the transmission of a signal causing the camera to begin imaging. In one example, as illustrated in FIG. 1, a point of sale terminal may send a tag signal 163 to a camera 110, via the video server 162, focused on the point of sale terminal 160, where the signal causes the camera 110 or associated local server 162 to create a tag when a sale is made. Alternatively, a point of sale terminal may create a tag only when an event outside an expected range of activities occurs, such as the sale of $1,000 worth of goods at a coffee shop. Other tags may be generated by a variety of methods, such as, for example, a ringing phone or a door opening. Tags may be sent wirelessly via the video server or via any method known in the art. In another embodiment, the tag may be preconfigured by an outside party, automatically generated by a repeating series of activities, or generated by the user. An example of a user-generated tag may be any time the user inserts a voiceover into a video segment, or any time the user annotates a video segment using video editing software.

If a user wishes, the user may identify parameters that apply to a plurality videos. The plurality of videos can exist on one video server in a local area network, or the plurality of videos can exist across numerous video servers connected via the Internet or other wide area network. The user may identify videos that are "logically-related" by specifying a common parameter or set of parameters that apply to a plurality of videos. Logically-related videos are described in more detail in reference to FIG. 5.

Figure 2:
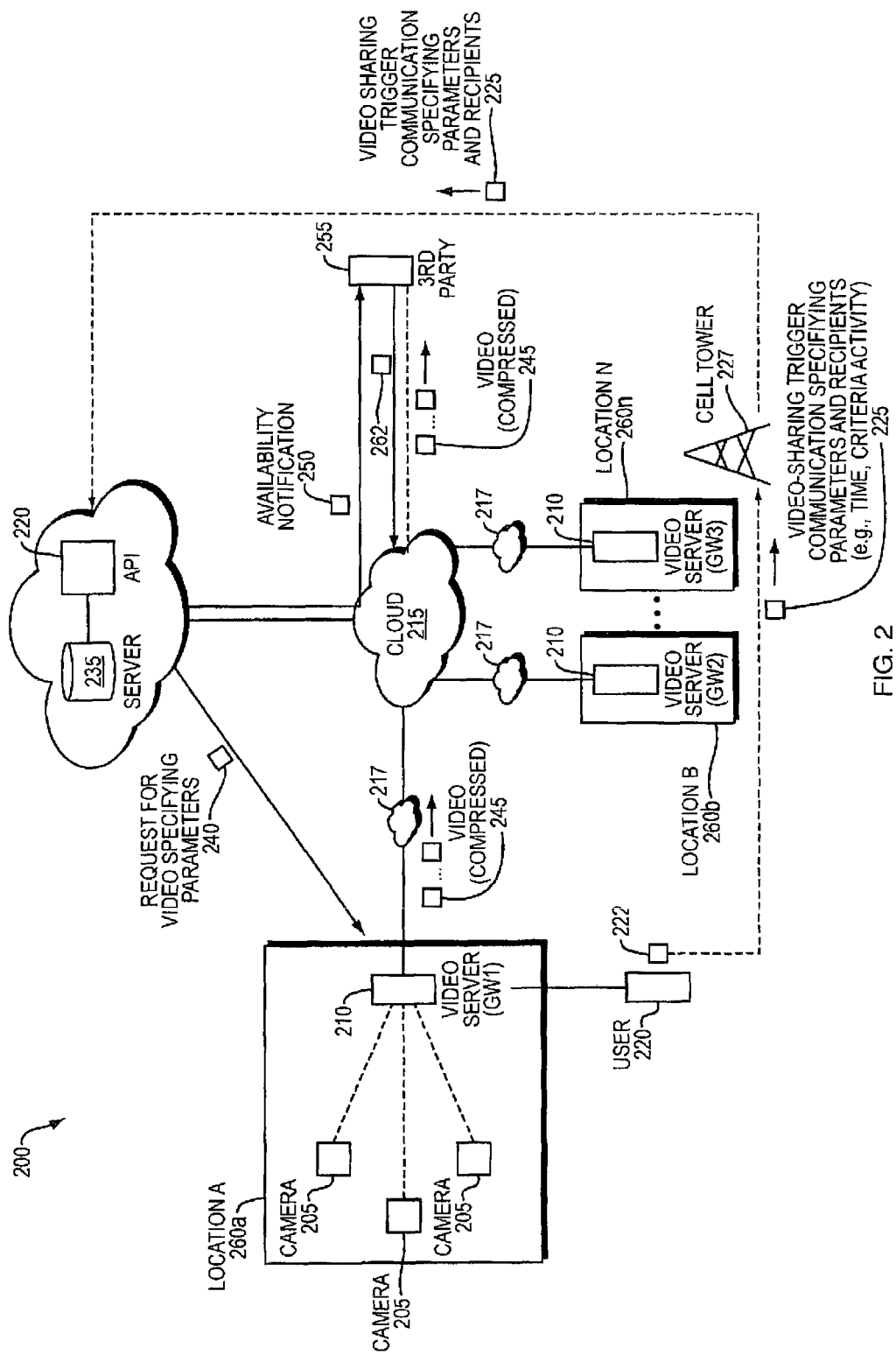
FIG. 2 is an illustration of communication pathways for sending and receiving video parameters and video segments.

FIG. 2 is an illustration of an overview 200 of the communication pathways for sending and receiving video parameters and video segments. Any number of cameras 205 may be installed in a location 260*a-n*. The cameras 205 may be connected to a local video server 210 via a local area network (not shown). The video server 210 can connect directly with a cloud 215 via the Internet 217 where the video server 210 can upload videos upon request one time, or on an on-going basis, or as otherwise provided to be performed autonomously.

A user 220, via a user device 222, may connect to the video server 210 either through a local area network or via the Internet. Alternatively, the user 220 may connect to multiple video servers 210 simultaneously at locations A through N 260*a-n* via the Internet. Similarly, each video server 210 may connect to other video servers 210 via the Internet.

The user 220, upon selecting parameters that identify video segments of interest and intended recipients, may send a video-sharing trigger communication 225 specifying parameters associated with a video on the video server 210 and identifying the receiving party. The communication 225 may travel through a local area network, through the Internet, or through a cellular network via a cell tower 227 to communicate with an API 230 located remotely. The API 230 may store data on a server or other data store 235.

Upon or after accepting the communication that identifies parameters associated with a video on a video server 225, the API 230 may send a request 240 to the video server 210 for the video identified by the user and specifying the parameters in the original communication. This request will then cause the video server 210 to transfer the desired video segments 245 to the cloud 215 via the Internet 217. The video 245 may be compressed in order to decrease the bandwidth required to share the video. Modes of compression when sharing video are described in more detail below in reference to FIG. 6E. The videos or images may optionally be encrypted in a manner known in the art.

Concurrently or after accepting the communication 225 from the user 220, or after the video 245 has been uploaded to the cloud 215, the API 230 sends an availability notification 250 to a designated receiving party 255. The availability notification 250 from the API 230 may also inform the cloud 215 that the receiving party 255 should be granted access to the video stored in the cloud 215. As used herein, "availability" may also refer to providing access to a party, such as through password-enabled access, or simply providing the receiving party with means to view the video. Once the receiving party 255 receives the notification 250, the receiving party may send a request 262 for the video to the cloud 215. The video 245 may subsequently be downloaded or viewed by the receiving party 255.

Additionally, as stated above, a plurality of video servers 210 located at multiple locations 260*a-n* analogous to location A 260*a* may connect to the cloud 215 via the Internet. The video servers 210 at any of locations A through N 260*a-n* may connect to each other and to the cloud 215 to create a network of video servers via the Internet. More detail with respect to these connections is described below in reference to FIG. 3. When the user 220 sends a video sharing trigger communication 225, the user may specify parameters that apply to a plurality of servers 210 from different locations 260*a-n*. Each video server 210 at each location 260*a-n* may upload videos to the cloud 215 if the user desires, either by specifying certain video servers, or requesting all logically-related videos.

Figure 3:
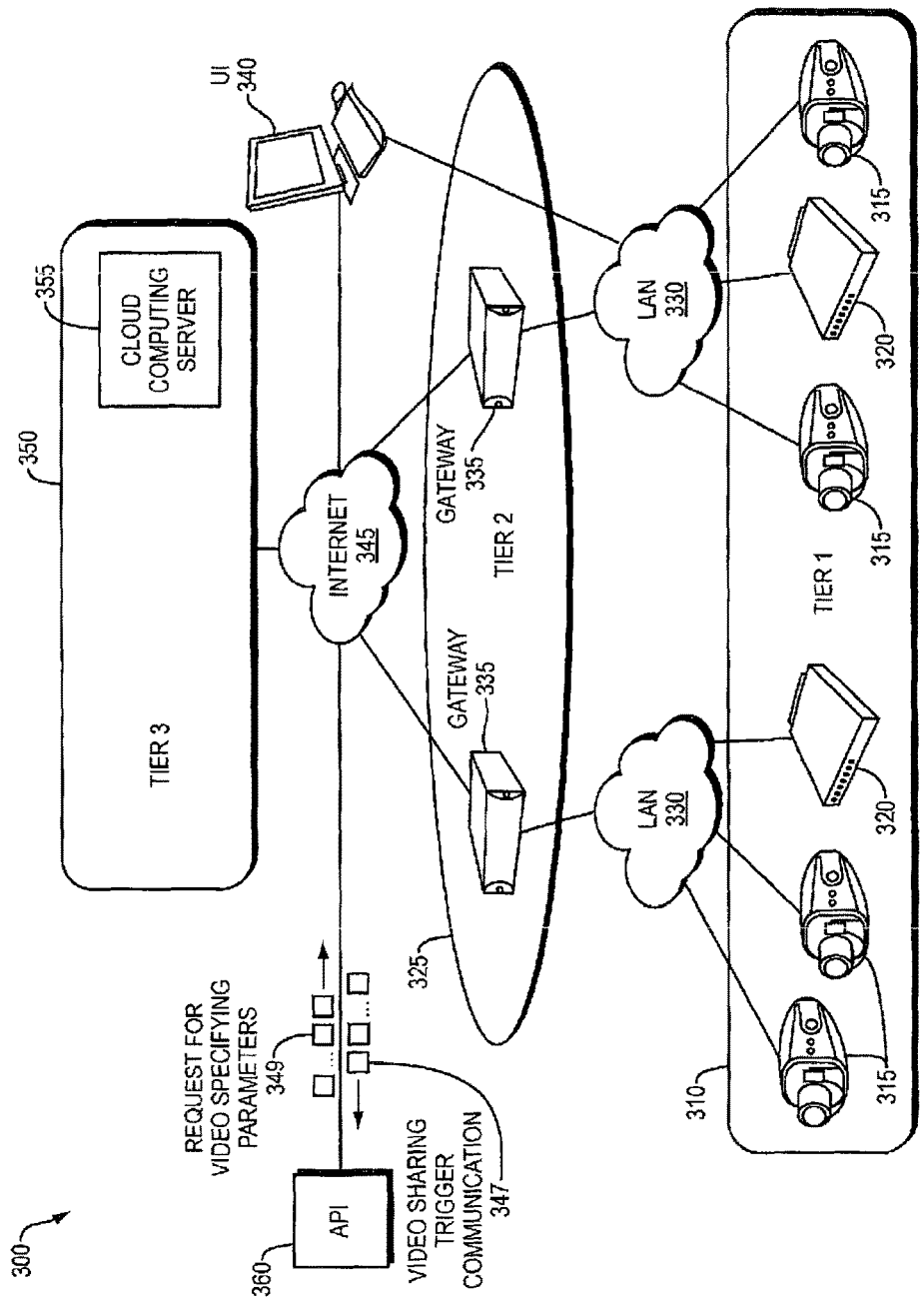
FIG. 3 is an illustration of an example embodiment of a three tiered network system in a surveillance video sharing system.

FIG. 3 is an illustration of an example embodiment of a three-tiered network system 300 in a surveillance video sharing system. Tier 1 310 represents a location, such as the store location in FIG. 1, where a number of security cameras 315 and a router 320 are connected to a local area network 330. Tier 1 can also represent multiple locations, with each location having its own local area network. The local area network 330 connects the cameras 315 and the routers 320 to the video server (e.g., gateway) 335 in tier 2 325. The video servers 335 connect directly to the Internet 345. Through the Internet, the user interface 340 may connect to enable a user to see the videos on the video servers 335. When the user chooses which videos to send, the user may send a video sharing trigger communication 347, through the Internet 345, to the API 360. The API 360 may then send a request for video specifying parameters through the internet 345 to the various video servers 335 that are connected at tier 2 335. The video servers 335, upon receiving the communication from the API 360, may upload the relevant video segments to tier 3 350, which is where the cloud-based service location 355 is housed or logically located.

In further embodiments, the network system 300 may be configured to perform additional operations and provide additional services to a user, such as additional video analysis and related notifications. Examples of such features are described in further detail in U.S. patent application Ser. No. 13/335,591, the entirety of which is incorporated herein by reference. For example, the cameras 315 may be configured to operate a video analytics process, which may be utilized as a scene analyzer to detect and track objects in the scene and generate metadata to describe the objects and their events. The scene analyzer may operate as a background, subtraction-based algorithm, and may describe an object with its color, location in the scene, time stamp, velocity, size, moving direction, etc. The scene analyzer may also trigger predefined metadata events such as zone or tripwire violation, counting, camera sabotage, object merging, object splitting, still objects, object loitering, etc. Object and event metadata, along with any other metadata generated by the edge device(s), can be sent to the gateway 335, which may store and process the metadata before forwarding processed metadata to the cloud computing server 355. Alternatively, the gateway may forward the metadata directly to the cloud computing server 355 without initial processing.

Figure 4:
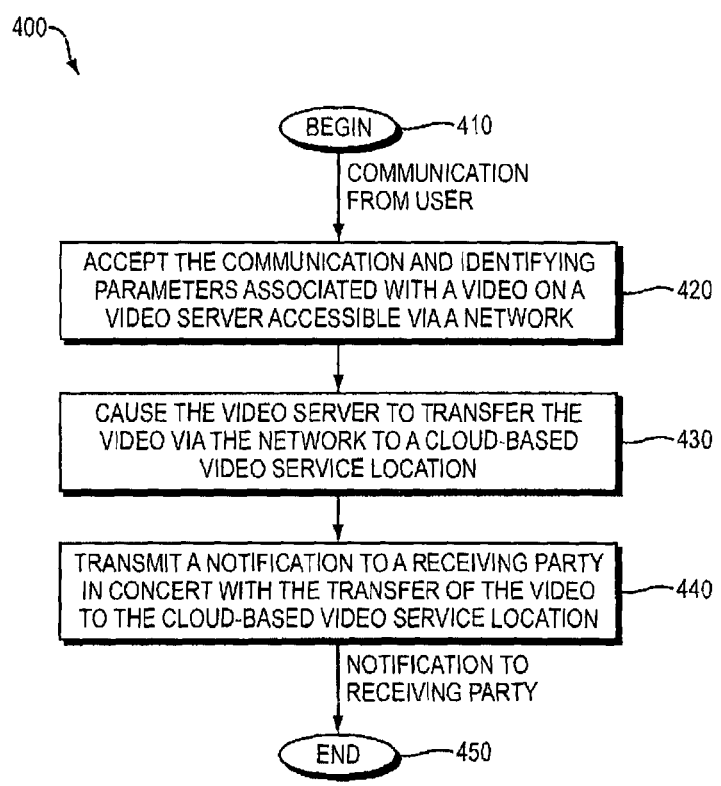
FIG. 4 is a flow diagram of an example embodiment of a process of communication associated with video transfer.

FIG. 4 is a block flow diagram of an example embodiment of a process of communication associated with video transfer. In an example embodiment, the process begins (410) when a communication is sent from a user. The system accepts the communication and identifies parameters associated with a video on a video server accessible via a network (420). This communication causes the video server to transfer the video via the network to a cloud-based video service location (430). Concurrently, or after uploading the video to the cloud-based service location, a notification is transmitted to a receiving party (440). Once the notification is sent to the receiving party, and the receiving party is granted access to the video, the process ends (450).

Figure 5:
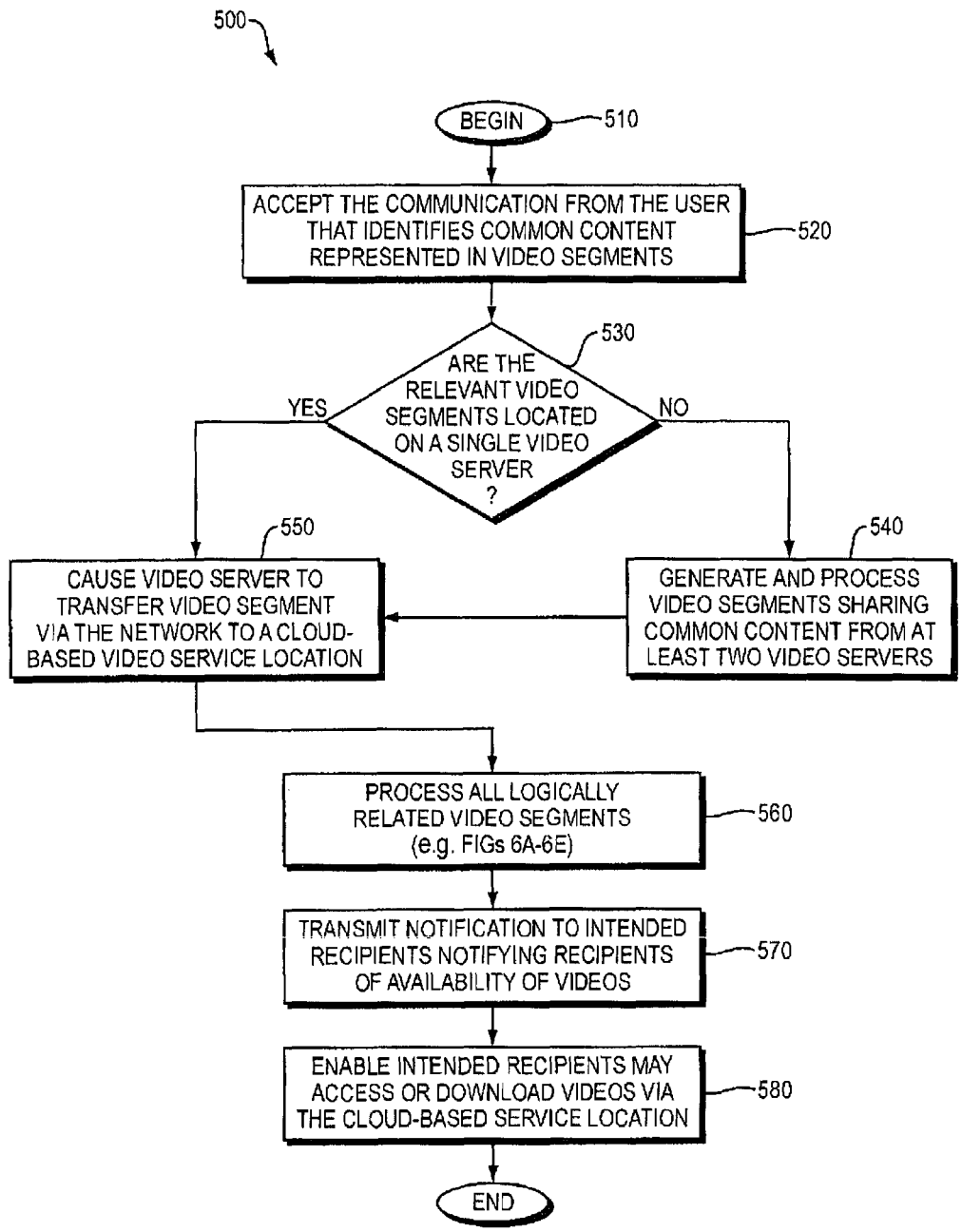
FIG. 5 is a flow diagram of an example embodiment illustrating a process of selecting and sharing logically-related videos.

FIG. 5 is a block flow diagram of an example embodiment illustrating the process of selecting and sharing logically-related videos. In FIG. 5, the example process relates to a user who wishes who share video from at least one video source, and further wishes to share only videos that contain common content. A set of videos that share common content are referred to as "logically-related videos."

"Logically related videos," as used herein, refer to videos that share, for example, a common content, tag, or time parameter. When a user selects certain parameters, a video server may identify a plurality of videos that share the specified parameters. For example, multiple videos may feature the same content, such as the same person or the same activity. By way of example, logically-related videos may be videos recorded by different cameras that all view the same person. Or, by way of another example, multiple videos may record deliveries at a loading dock at different stores throughout the day. These videos may be stored on different video servers that are all connected to the Internet. Therefore, logically-related videos include videos that share either a common location type (e.g., videos that focus on a loading dock, or a point of sale terminal), a common content type (e.g., videos that focus on a particular person, or videos that contain motion), or a common tag type (e.g., videos that have a common tag such as signal tags or an automatically generated tag).

Continuing to refer to FIG. 5, the process begins when the user sends a communication identifying the desired common content represented in video segments (510). The communication is accepted (520), and the system determines whether there are relevant video segments located on more than one video server (530). If the video segments are located on more than one server, the plurality of video servers will generate and process video segments sharing common content (540). If the video segments are located on only one server, the video server will select the desired video segments that contain the desired content (550). Once the desired video segments have been identified, they are transferred via the network to a cloud-based service location (550).

Once the videos are transferred to the cloud-based service location, the video segments may be processed in any manner desired by the user (560). Examples of processing selected video segments are described in reference to FIGS. 6A-6E. Concurrent with the transfer of the video to the cloud-based service location, a notification is transmitted to the receiving party notifying the recipients of the availability of the videos (570). The notification enables receiving party to access or download the videos via the cloud-based service location (580). Upon receipt of the video by the receiving party or the notification to the receiving party, the process ends (590).

Figure 6C:
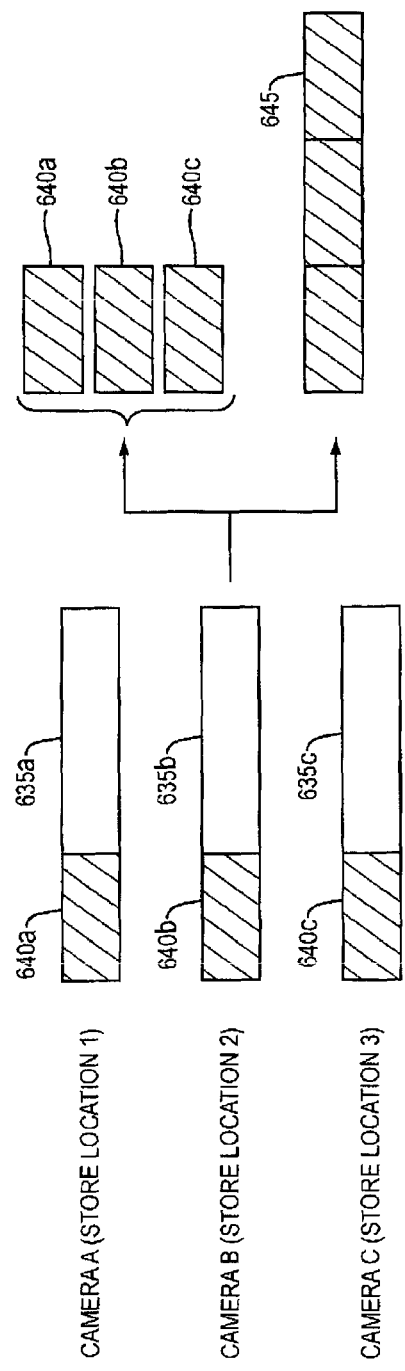

FIGS. 6A through 6E are illustrations of different methods of processing video timelines and selecting video segments of interest. FIG. 6A is an illustration of a timeline of a video. Video timeline 610 represents an entire length of video recorded by Camera A. A user may identify a video segment of interest 615 by naming a set of desired parameters, such as a start and stop time, or by searching for particular content. The video segment of interest 615 may be isolated sent to the cloud, as described in more detail above in reference to FIGS. 2 and 5.

FIG. 6B is an illustration of multiple video timelines. Each timeline 620a-c represents an entire video recorded by Cameras A-C. In the present example, Cameras A-C provide different visual perspectives of a location, such a retail store analogous to the retail scene in FIG. 1. In this example, Camera A is positioned to image a door, Camera B is positioned to image an aisle, and Camera C is positioned to image a cash register. A user may identify parameters that highlight the video segments of interest 625a-c. In one example, the user may select video segments that contain one person walking from the door, down the aisle, and to the cash register. In another example, the user may select segments that occur in sequential order (e.g., video segment 625a occurs between 1:00 and 1:01, 625b occurs between 1:01 and 1:02, and 625c occurs between 1:02 and 1:03). When the video segments of interest 625a-c are selected, they may be isolated from the larger video timelines 620a-c and may be processed such that the video segments of interest 625a-c are placed in sequential order and create a single video 630. The resulting video 630 may then be sent to the receiving party and viewed as a single video.

FIG. 6C is an illustration of multiple video timelines. Each video timeline 635a-c represents an entire video recorded by Cameras A-C. In this example, Cameras A-C, in FIG. 6C, are located at different store locations. Each Camera A-C can be connected to a local area network to a video server, as in FIGS. 2 and 3. In the present example, the user may wish to isolate time-synchronized videos that share a common start time and a common stop time. For example, if the user wishes to view the procedures that different employees use when opening a store in the morning, the user may select video from all store locations, starting at 6:00 AM and ending at 7:00 AM. The highlighted areas become video segments of interest 640a-c.

The user may wish to send the three video segments of interest 640a-c isolated from their respective video timelines 635a-c. One option the user may have is to send the three video segments 640a-c as three separate files to the cloud-based service location. Alternatively, the user may choose to process the video segments 640a-c into one video 645, which can be sent to the cloud-based service location.

Figure 6D:
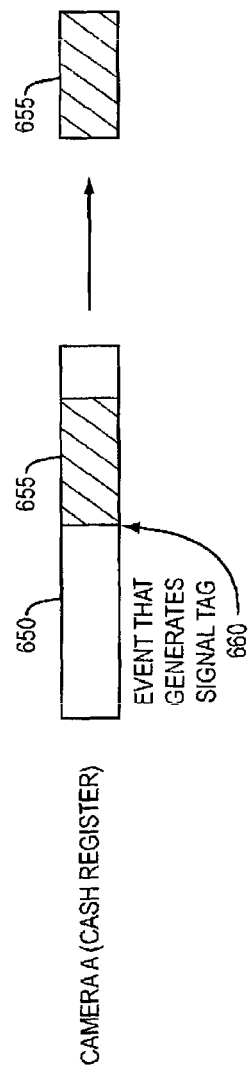

FIG. 6D is an illustration of a timeline of a video. The entire video timeline 650 is recorded by Camera A, which is positioned to view a cash register or point of sale terminal. In the present example, a tag is generated by an event 660, for which the user may search to identify a video segment of interest 655. Example events that create a tag are described above in reference to FIG. 1. The video segment of interest 655 may then be isolated, exported, and uploaded to the cloud-based service location.

Figure 6E:
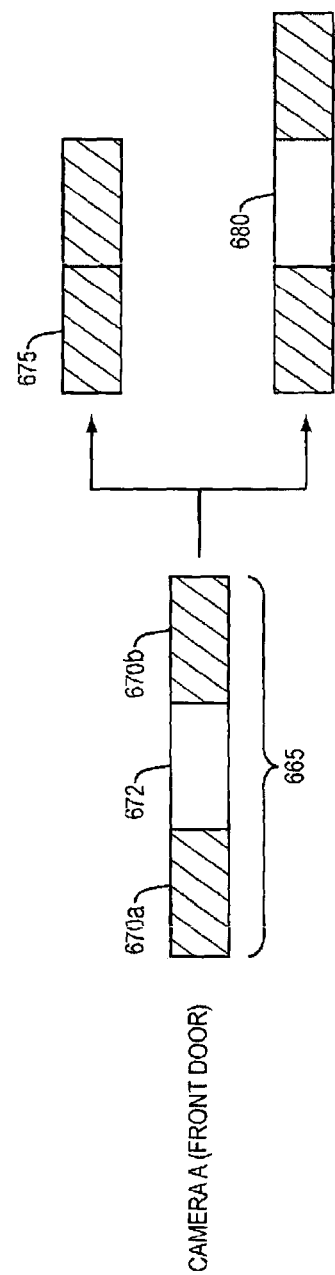

FIG. 6E is an illustration of a timeline of a video. The entire video timeline 665 is recorded by Camera A, which is positioned to image an entryway. The user may identify two video segments of interest 670a-b, which are separated by a length of undesired video 672. In one example, the user may wish to send only the two video segments of interest 670a-b together to be viewed sequentially, which results in a new composite video timeline 675. In another example, however, the user may wish to retain the length of video between the two video segments of interest 670a-b. But, to reduce the bandwidth required to send the video, the user may instead insert or choose a single frame from the length of undesired video 672 to represent the undesired video for a length of time determined by the user. The resulting video 680 contains the video segments of interest 670a and 670b, but with a single frame played for a length of time between the video segments of interest 670a-b.

Figure 7:
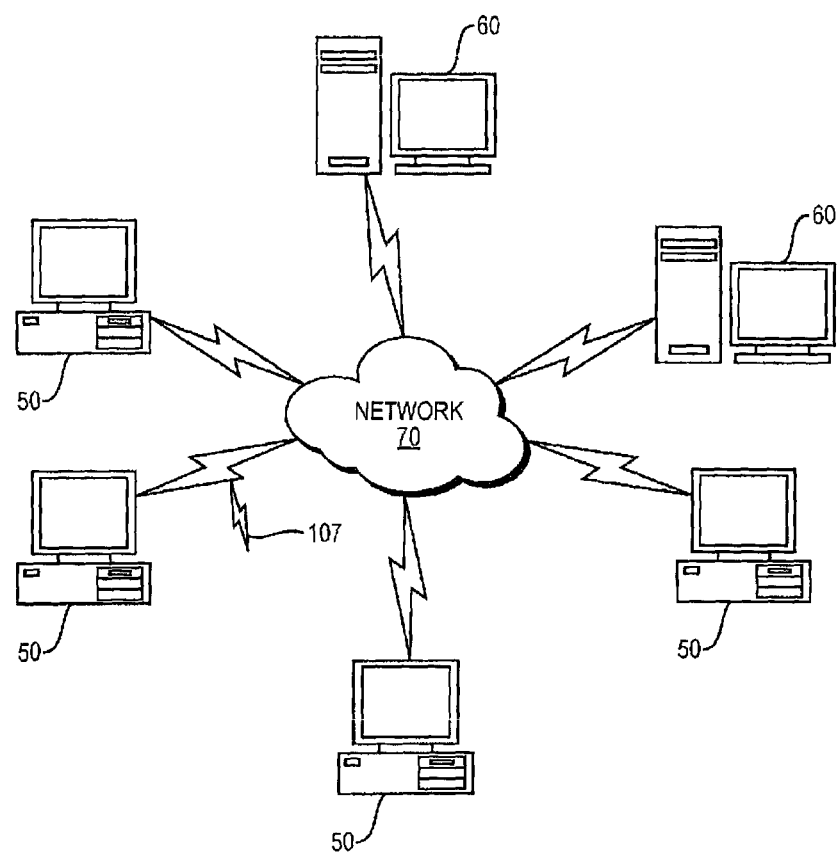
FIG. 7 illustrates an example computer network.

FIG. 7 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, local area or wide area networks, and gateways that currently use respective protocols (TCP/IP, Bluetooth, etc.) to communicate with one another. Other electronic device/computer network architectures are suitable.

Figure 8:
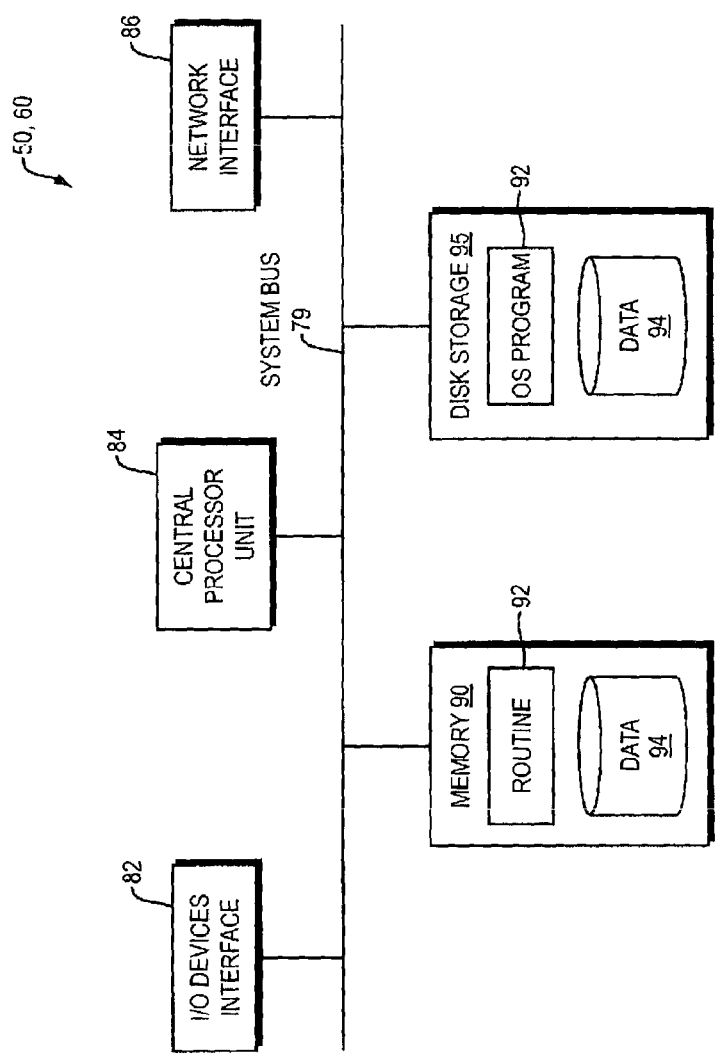
FIG. 8 illustrates an example internal structure of a computer or server, such as a video server employed in the network of FIG. 2.

FIG. 8 is a diagram of the internal structure of a computer (e.g., client processor/device 50 or server computers 60) in the computer system of FIG. 7. This internal structure may, for example, be employed in the cloud video server(s) of FIG. 2. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

While this invention has been particularly shown and described with references to example embodiments thereof, it will be understood by those skilled in the art that various changes in form and details may be made therein without departing from the scope of the invention encompassed by the appended claims.

What is claimed is:

1. A method for sharing video using a cloud-based video service, comprising:
   capturing videos using a plurality of cameras installed in a plurality of geographic areas, each of the captured videos including one or more video segments;
   storing the captured videos for each of the plurality of cameras on respective video servers located in the plurality geographic areas in which the plurality of cameras are installed, the video servers accessible via a network;
   transmitting, from a cloud-based service location, a video-sharing communication request to the video servers in response to the cloud-based service location receiving user selected parameters that identify video segments of interest in the captured videos and intended recipients of the video segments of interest, wherein the user selected parameters are used by the video servers to identify the video segments of interest, the user selected parameters including content parameters, time parameters, or video tags, and the video segments of interest including logically-related video segments based on the user selected parameters;
   causing the video servers having the video segments of interest to transfer the video segments of interest via the network to the cloud-based video service location; and
   transmitting a notification to the intended recipients of the video segments of interest, or causing the cloud-based video service location to transmit the notification, in concert with the transfer of the video segments of interest, the notification providing availability information of the video segments of interest at the cloud-based service location.

2. The method of claim 1, wherein causing the video servers having the video segments of interest to transfer the video segments of interest includes causing the video servers to transfer a plurality of time-synchronized videos.

3. The method of claim 2, further comprising selecting the plurality of time-synchronized videos from video segments recorded in parallel between a common start time and a common stop time.

4. The method of claim 2, further comprising selecting the plurality of time-synchronized videos from video segments recorded between a series of non-overlapping start times and stop times.

5. The method of claim 1, wherein causing the video servers having the video segments of interest to transfer the video segments of interest includes causing the video servers to transfer a plurality of content-synchronized videos.

6. The method of claim 5, wherein the content-synchronized videos are video segments recorded in series or parallel by multiple video collectors that contain a common object.

7. The method of claim 6, wherein the common object is a person.

8. The method of claim 5, wherein the content-synchronized videos are video segments recorded in series or parallel by multiple video collectors that contain a common activity.

9. The method of claim 7, wherein the common activity is motion.

10. The method of claim 7, wherein the common activity is a point of sale transaction.

11. The method of claim 1, wherein the content-synchronized videos are video segments recorded in series or parallel by multiple video collectors that contain at least one common tag.

12. The method of claim 11, wherein the at least one common tag is selected from the group consisting of: a preconfigured tag, an automatically generated tag, a user generated tag, or a signal tag produced as a function of a signal provided by a device under video surveillance.

13. The method of claim 12, wherein the signal tag represents an event outside an expected range of activities, the tag being generated by a point of sale terminal.

14. The method of claim 1, further comprising causing the video servers having the video segments of interest to transfer a plurality of logically-related videos.

15. The method of claim 14, wherein the plurality of logically-related videos are related based on a common location type.

16. The method of claim 14, wherein the plurality of logically-related videos are related based on a common content type.

17. The method of claim 14, wherein the plurality of logically-related videos are related based on a common tag type.

18. An apparatus for sharing video in a cloud-based video service, comprising:
at least one processor; and
at least one memory with computer code instructions stored thereon, the at least one processor and the at least one memory with computer code instructions being configured to cause the apparatus to:
capture videos using a plurality of cameras installed in a plurality of geographic areas, each of the captured videos including one or more video segments;
store the captured videos for each of the plurality of cameras on respective video servers located in the plurality geographic areas in which the plurality of cameras are installed, the video servers accessible via a network;
transmit, from a cloud-based service location, a video-sharing communication request to the video servers in response to the cloud-based service location receiving user selected parameters that identify video segments of interest in the captured videos and intended recipients of the video segments of interest, wherein the user selected parameters are used by the video servers to identify the video segments of interest, the user selected parameters including content parameters, time parameters, or video tags, and the video segments of interest including logically-related video segments based on the user selected parameters;
cause the video servers having the video segments of interest to transfer the video segments of interest via the network to the cloud-based video service location; and
transmit a notification to the intended recipients of the video segments of interest, or causing the cloud-based video service location to transmit the notification, in concert with the transfer of the video segments of interest, the notification providing availability information of the video segments of interest at the cloud-based service location.

\* \* \* \* \*